United States Patent [19]
Olson

[11] Patent Number: 5,833,401
[45] Date of Patent: *Nov. 10, 1998

[54] GEOINSULATION BLANKET AND SYSTEM FOR SOIL

[75] Inventor: Michael A. Olson, Ann Arbor, Mich.

[73] Assignee: Abeltech, Ann Arbor, Mich.

[ * ] Notice: The terminal 18 months of this patent has been disclaimed.

[21] Appl. No.: 418,707

[22] Filed: Apr. 7, 1995

[51] Int. Cl.⁶ ........................................................ E02B 3/12
[52] U.S. Cl. .............................. 405/258; 405/16; 405/19; 405/128; 405/270; 24/443
[58] Field of Search .............................. 405/16, 128, 270, 405/268, 19; 24/442, 443, 31 V

[56] References Cited

U.S. PATENT DOCUMENTS

| | | |
|---|---|---|
| 752,637 | 2/1904 | Mankedick et al. . |
| 3,707,850 | 1/1973 | Connell . |
| 3,846,989 | 11/1974 | Burt et al. . |
| 4,125,983 | 11/1978 | Jarrell ........................................... 52/742 |
| 4,166,709 | 9/1979 | Valiga ................................... 405/128 X |
| 4,565,468 | 1/1986 | Crawford ................................. 405/270 |
| 4,589,804 | 5/1986 | Paeglis et al. ............................ 405/270 |
| 4,996,491 | 2/1991 | Sample ....................................... 405/19 |
| 5,288,168 | 2/1994 | Spencer ................................ 405/129 X |
| 5,360,294 | 11/1994 | Carriker et al. ......................... 405/270 |
| 5,401,118 | 3/1995 | Kramer .................................... 405/129 |
| 5,447,389 | 9/1995 | Olson .................................. 405/270 X |

FOREIGN PATENT DOCUMENTS

| | | |
|---|---|---|
| 1479772 | 7/1977 | United Kingdom . |
| 92/10617 | 6/1992 | WIPO . |

*Primary Examiner*—Tamara L. Graysay
*Assistant Examiner*—Tara L. Mayo
*Attorney, Agent, or Firm*—Robert L. McKellar

[57] ABSTRACT

A system used to insulate soil, most practically in waste sites and the like, including a plurality of geoinsulation blankets and an anchoring means. Each blanket has a flexible plastic casing sealed around its perimeter with at least one air vent through it, a resilient insulation batt contained within the casing, and attachment means of the hook and loop type positioned along its perimeter to adjoin overlapping edges of blankets in the system.

5 Claims, 1 Drawing Sheet

GEOINSULATION BLANKET AND SYSTEM FOR SOIL

This invention deals with a novel insulation blanket and a system in which it can be used to insulate soil, most practically in waste sites and the like.

With specificity, this invention deals with a blanket type thermal insulation that can be placed over earthen substrates to prevent exaggerated changes in substrate temperature. The flexibility, novel attachment method and novel resilient insulating batt provides practical and economical thermal insulation of large earthen substrates.

BACKGROUND OF THE INVENTION

There are many uses for thermal insulation that do not require any physical attributes from the materials except ease of use and the thermal properties of the materials themselves.

However, many insulating materials cannot be used unless they are modified or configured to fit the particular end use. Such uses can be found for example in U.S. Pat. No. 3,707,850 to Connell, et al., which issued on Jan. 2, 1973, in which insulating material is bagged up in small bags, and a multitude of these bags are layered to insulate a chamber in the earth.

Another special configuration to provide insulation to a substrate can be found in an abstract from Derwent Publications Ltd. 86-156540/25, abstracting German patent 444,728, in which polystyrene foam sheets are prepared having at least one corrugated surface in order to fit the corrugated surface of a roof. The polystyrene sheets are then top-coated with concrete to hold them in place.

A further publication of special insulation can be found in 1987 Derwent Publications 87-178862/26 abstracting German patent DE 546,032, in which prefabricated rectangular panels, each having a core made of hard plastic foam material, preferably polystyrene, is used to cover a roof made of corrugated asbestos cement sheets.

Yet another approach to insulating an embankment foundation for liquid storage, especially in cold climates such as Alaska, is shown in U.S. Pat. No. 3,846,989, issued to Burt, et al., on Nov. 12, 1974. The so-called "Arco" insulation is a foamed-in-place polyurethane insulation layer that is sprayed directly on the substrate and allowed to foam and cure. No coverings or carriers for this foam are disclosed or shown.

The Burt et al. patent describes in intimate detail the problems associated with attempts to insulate portions of the earth's substrate. The invention disclosed herein, in it's various embodiments, overcomes many of the problems described by Burt et al.

Further, there is described in U.S. Pat. No. 752,637, issued Feb. 16, 1904, a device for protecting embankments which consists of canvas meshes which are formed into pockets into which a weighted material, such as sand, is placed, in order to anchor the mesh to the soil. This device allegedly prevents the washing away of the embankment by water.

Yet another disclosure can be found in British patent specification 1,479,772, published Jul. 13, 1977, in which a drainage sheet material is shown which is comprised of a solid panel having a foam core which further contains spring-like spirals, which panel provides insulation while allowing water to be carried away from the site of the panel.

A PCT filing having the number WO 92/10617 describes a protective mat for sealing webs. Eventhough the publication describes this mat as being useful for sealing webs, attention is directed to the construction of the mat itself, as it comprises a mat composed of at least two superimposed, mutually spaced linked textile flat structures which have arranged between them, a granulated material which keeps these two textile flat structures apart during use.

A somewhat closer art disclosure is the French patent 2,558,192, which describes an insulating wall for use in buildings, such device including two layers of fabric connected together by ribs made of the fabric in such a way as to form pockets in which some elements of insulating material are arranged.

This device requires ribs between the flat layers of fabric, it is not constructed of flexible plastics and thus it is unable to inhibit the passage of water into its interior; it has no provision for the passage of air into and out of the device; and it does not disclose a means by which the devices may be attached to one another, and it has the problems associated with the manufacturing of the casing, particularly with attaching the outer wall, divider wall, and inner wall together, and it has problems with shipping and storing because of the bulk of the finished wall.

Finally, note should be made of the device of the copending U.S. patent application having Ser. No. 08/123,633, filed Sept. 17, 1993, now pending, in the name of the inventor named herein, Michael A. Olson, in which there is described a device and a means for insulating soil, in which the device is comprised of two opposing walls which are attached to each other at the edges, and which has interior ribs to prevent the opposing walls from spreading away from each other. This is required, because the insulation used in that device is particulate and is provided by a pressurized means which requires that the opposing walls have to be restrained in some manner to prevent the device from assuming a balloon configuration.

This device also has the disadvantages related to manufacturing of the casing owing to the difficulty of attaching the outer wall, divider wall, and inner wall together. Shipping, handling, and storing the finished blankets is expensive because they are voluminous. Attaching the blankets together over the substrate is difficult because of fixed attachment points around their perimeters and because the surface may be curved or angular.

Thus, in order to service the activities associated with the insulation of the earth's surface, the materials used must have sufficiently low thermal conductivity to protect the soil from freezing or reaching hot temperatures. The materials must have sufficient strength and durability to withstand the rigors of handling, installation, and use and must be resistant to weathering, including precipitation, wind, ultraviolet radiation, and temperature extremes.

Installation and use of the materials should minimize disruption to existing construction and operation practices. The materials should be capable of being installed and removed without damaging the substrate. Use of the materials should minimize risks to the health and safety of personnel.

The materials and methods must be economical from a total cost standpoint, through the entire life cycle of the materials, including manufacturing, shipping, handling, installation, use, removal, and storage. Lastly, the practical ability to remove the materials and reuse them over other earthen substrates is desirable because it reduces the total cost of insulating the substrates over time.

The novel device of this invention overcomes many problems with thermally insulating earthen substrates.

The device has significant advantages, among them: ease of closely and continuously securing an insulating material over a curved or angular substrate so that the material cannot be redistributed by wind, precipitation, or other forces; ease of protecting the material from precipitation and icing that may render it ineffective; ease of installing the material without damaging the substrate; ease of shipping, handling, installing, removing, and storing the material in substantially reduced volume; and reusability of the material.

A big potential use for the device of this invention is thermal insulation of compacted clay hydraulic barriers that are potentially subject to high and low temperatures, which temperature extremes affect the usefulness of the compacted clay.

Hydraulic barriers are commonly constructed of compacted clay to attenuate fluid flow and to prevent the migration of contaminants into the environment. Some examples are landfill liners and covers; remediation site covers; secondary containment structures; and liners for surface impoundments, storage ponds, sewage lagoons, and heap-leaching pads. Hydraulic barriers are often left partially exposed to atmospheric and solar-induced temperature extremes. Geotechnical researchers have recently found temperature extremes to damage the ability of compacted clay to attenuate flow. Therefore, compacted clay should be protected from temperature extremes to maintain low hydraulic conductivity.

A hydraulic barrier may be protected by covering it with a sufficiently thick layer of the impounded material before the onset of offending climatic conditions. In the case of a landfill liner, for example, the impounded material is solid waste. Landfill liners vary widely in size, but typically encompass more than five acres. It is often impractical to cover a landfill liner completely with sufficient solid waste in time to prevent its exposure to temperature extremes. There is a need for an insulating device designed to prevent compacted clay landfill liners from freezing. The instant invention seeks to overcome the inadequacies of the aforementioned common insulating materials and methods while taking advantage of its many favorable characteristics.

THE INVENTION

This invention deals with a novel geoinsulation blanket and a system in which it can be used to insulate soil, most practically in waste sites and the like. With specificity, this invention deals with a blanket-type thermal insulation that is placed on earthen substrates to prevent exaggerated changes in substrate temperature. The blanket's flexibility, novel attachment method, and insulative batt provide for practical and economical thermal insulation of large earthen substrates.

Thus, there is disclosed herein a geoinsulation blanket comprising a flexible plastic casing having an outside perimeter consisting of two substantially opposing parallel edges, a front end, a back end, a top surface and a bottom surface. The casing is sealed around its outside perimeter to prevent the ingress and egress of air because the casing has at least one air vent through it to control the ingress and egress of air.

The casing has a hook and loop type attachment means whereby a wide strip of the attachment means selected from the group consisting of a hook and loop type of attachment means is fixedly mounted on the top surface and near the outside perimeter of the casing and along one parallel edge and one end. To accommodate the attachment of the casings together, a wide strip of the attachment means not selected for the top surface is fixedly attached on the bottom surface and near the outside perimeter along the opposite parallel edge and the opposite end. Finally, the casing contains a resilient insulative batt.

There is further disclosed in this specification a system of such geoinsulation blankets, connected together to form a covering over a substrate and thus there is claimed a system for insulating a substrate, said system comprising one or more of the insulative blankets disclosed and claimed herein secured together to form a covering on the substrate, said system being secured on the substrate by a sufficient anchoring means:

Thus, the present invention has as its principal object a geoinsulation blanket for compacted clay hydraulic barriers. By insulating the hydraulic barrier, the present invention seeks to completely mitigate the effects of successive freeze-thaw cycles, or excessive heating, by actually preventing the occurrence of the freeze aspect of the cycle or excessive heating due to the sun.

Still, another object of the present invention is to provide a geoinsulation blanket that allows economical thermal insulation of large earthen substrates through the entire life cycle. The blanket may be easily removed, stored, and reused.

Yet another object of this invention is a geoinsulation blanket that is used to insulate a compacted clay landfill liner.

Further, the present invention also has as one of its objectives, a geoinsulation blanket that is easily transported-to and employed at the landfill site. The blanket can be manufactured at a manufacturing facility, or can be partially manufactured at the landfill site.

DETAILED DESCRIPTION OF THE INVENTION

Figure 1:
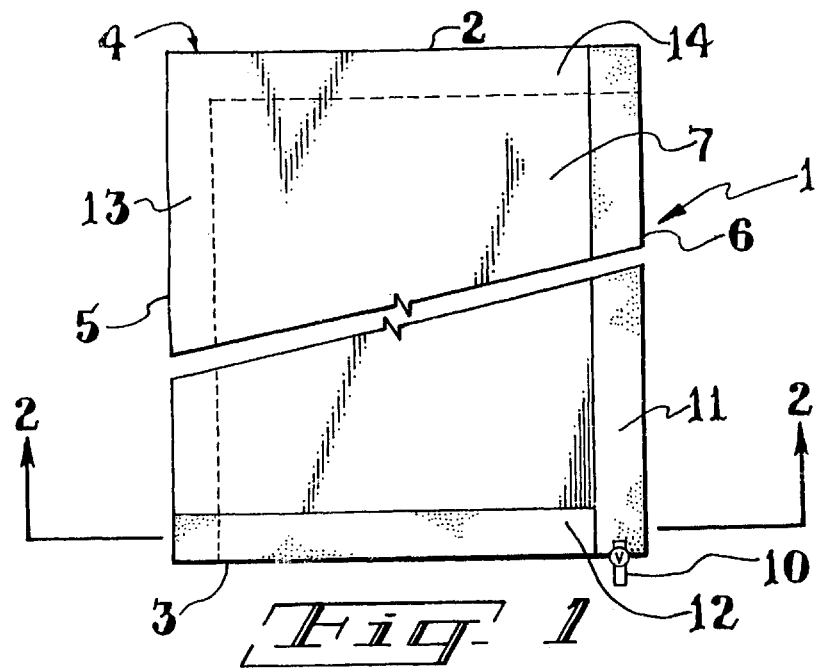
FIG. 1 is a top view of the device of this invention, wherein "top" designated only for purposes of clarifying the discussion with regard to the device of this invention.

Referring now to FIG. 1, there is shown a top view of a geoinsulation blanket 1 of this invention. The geoinsulation blanket 1 is comprised of a flexible, water impermeable casing 2 which has, for purposes of clarification of the discussion, a front end 3, a back end 4, two substantially opposing parallel edges consisting of the left side 5, and a right side 6, a top surface 7 and a bottom surface 8 (shown in FIG. 2). The casing 2 is sealed against water and air around its entire perimeter to form a closed sack configuration.

The casing 2 that is used in the device of the instant invention must be impervious to water, flexible, inexpensive and durable. The purpose of the casing 2 is to prevent water infiltration into the batt 9. The casing 2 is usually fabricated from a continuous "sleeve" of thin thermoplastic polymer of about 5 to 15 mil thickness into which the insulation batt 9 is inserted. The "sleeve" is then sealed to form the ends 3 and 5. The presence of the batt 9 within the casing 2 results in essentially a rectangular configuration to form the geoinsulation blanket 1, wherein the overall dimensions of the geoinsulation blanket 1 are about four to 10 feet wide and have a length of 10 to 60 feet. The overall thickness of the insulative blanket 1 is on the order of one to six inches thick.

The preferred overall dimensions of the insulative blanket 1 for purposes of this invention are about 8 feet wide, by 20 feet in length, and about 2 inches thick. With the insulating batt 9 having a specific weight of 1.5 pcf, the blanket weighs about 53 pounds.

The color of the casing 2 may be chosen depending on the radiative heat transfer characteristics desired for the particular covering. Therefore, the casing 2 of the instant invention can be used as a clear plastic, translucent or opaque plastic, or it can be colored by pigments prior to the extrusion of the "sleeve".

The casing 2 may contain carbon black or ultraviolet inhibitors to attenuate ultraviolet degradation. The carbon black content may dictate that the color of the casing 2 is black.

The surface finish of the casing 2 is not significantly important in this invention. However, it should have low friction characteristics to provide for ease of insertion of the insulation batt 9 into the "sleeve" and to provide for ease of installation and stability over a sloped compacted clay substrate.

With regard to FIG. 1, there is also shown an air vent 10 which allows for the ingress and egress of air such that it allows air to escape from the insulative blanket 1 while it is being compressed into a compact roll economical handling, for shipping, and storage. The vent 10 allows air to enter the blanket 1 to expand the blanket 1 such that it has essentially the same form as it had before compression.

For purposes of this invention and with regard to FIG. 1, the air vent 10 is a valve, preferably manufactured from lightweight metal, or durable plastic. However, it is contemplated within the scope of this invention to have an air vent which may simply consist of a discontinuity in the perimeter seal at the end of the casing 2. It is also contemplated within the scope of this invention to provide an air vent which has the means to allow for the rapid compression or expansion of the casing 2 using a suitable air compressor or vacuum pump.

Figure 2:
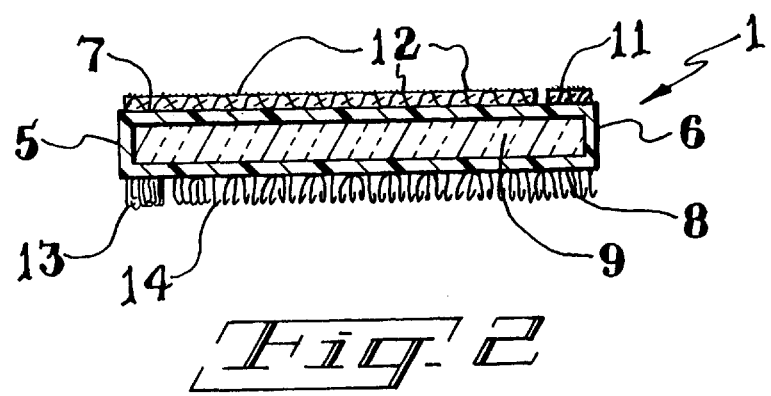
FIG. 2 is a sectional end view of the device of this invention taken through line 2—2 of FIG. 1.
Figure 3:
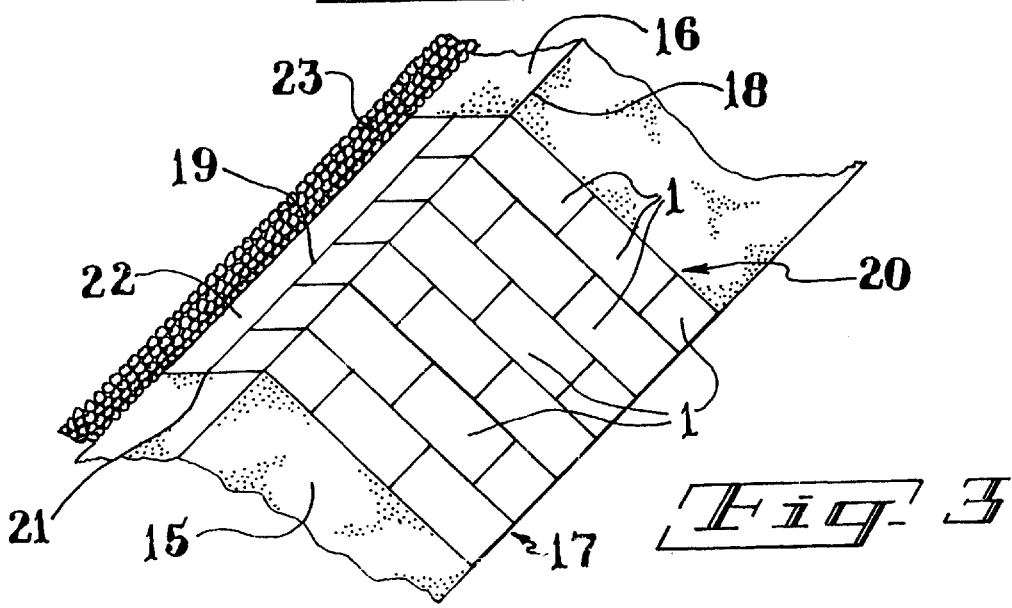
FIG. 3 is an isometric view of several devices of this invention during use, attached together over a portion of a landfill liner sideslope and anchored down to form a system.

With regard to FIG. 2, there is contained within the casing 2 an insulation batt 9, which insulation batt 9 is a resilient insulative material such as fiber glass or the like, the purpose of which is to provide the thermal insulating properties to the geoinsulation blanket 1. Such resilient insulation material can be for example fiber glass batt with a density in the range of 0.5 to 3.0 pcf. The batt 9 must be thermally efficient with a low cost per unit thermal resistance per unit area. The thickness of the batt 9 is selected based on the climatic conditions, the desired level of frost prevention, and the thermal resistance necessary to achieve the desired level of frost prevention.

The insulation batt 9 for purposes of this invention, must be cohesive and flexible, thereby eliminating any need for a divider wall in the casing, while still providing for intimate coverage of curved and angular substrates. Sometimes it may be desirable to glue the batt 9 to the casing 2 to prevent shifting and bunching during handling. It must also be resilient in that it needs to be compressible to a small fraction of its original volume, yet will expand to its original volume after the compressive force is removed.

Still with regard to FIG. 1, there is further shown an attachment means for one geoinsulation blanket 1 to other geoinsulation blankets 1 to form a covering over a substrate. The most convenient means of such attachment is the well-known Velcro® hook and loop fastening system.

For purposes of this invention and for clarification of the inventive device, there is a wide strip 11 of such material, for example the loop, provided along the right side 6, and on the top surface 7. It is contemplated within the scope of this invention to have a continuous strip, which covers the entire top edge of the insulative blanket 1.

There is further provided a similar wide strip 12 on the top surface 7, and along the edge of the front end 3, which runs essentially perpendicular to the wide strip 11. In FIG. 2, an end view of the wide strip 11 is shown at 11, and an edge view of wide strip 12 is shown at 12.

In order to complete the attachment means for the device of this invention, and with regard to FIG. 2, there is shown on the bottom surface 8, and along the left side 5, a narrow strip, for example, the hook 13 of the attachment means. There is also a narrow strip 14 of the hook mounted on the bottom surface 8, at the end 4, along the edge thereof, the narrow strip 14 being shown in phantom in FIG. 1.

For purposes of this invention, the loop strips 11 and 12 have been shown on the top surface 7, and the hooks strips 13 and 14 on the bottom surface, but it is contemplated within the scope of this invention to have the loops on the bottom surface 8 and the hooks on the top surface 7.

For purposes of this invention, the term "wide" when applied to the loop of the attachment means, is intended to be about one foot, whereas when the term "narrow" is applied to the hook of the attachment means, is intended to be about four inches. The attachment means can be attached to the surface of the casing by any means sufficient to give the attachment durability and strength, such as adhesives or thermal bonding.

The loop strips 11 and 12 are shown on the top surface 7, and the hook strips 13 and 14 on the bottom surface 8. Alternately, the blanket 1 may have the loop strips 11 on the bottom surface 8 and the hook strips 12 on the top surface 7.

Thus, as will be discussed infra, when the geoinsulation blankets 1 are overlapped at their edges to create a covering, the loop and hook attachment means allows the geoinsulation blankets 1 to be connected to each other to form a continuous covering.

With specificity, there is shown a portion of a landfill slope 15 showing a top, flat surface 16, both of which are covered with geoinsulation blankets 1 attached together to form a covering 20.

The covering 20 is installed by laying a row of geoinsulation blankets 1 at the base 17 of the landfill slope 15. Thereafter, the geoinsulation blankets 1 are laid shingle-like over the lower geoinsulation blankets 1 until the covering 20 is formed up to the top edge 18, and then continued on past the top edge 18 and onto the flat surface 16, this method being used to build the covering 20 until that portion of the landfill that is desired to be covered is accomplished.

At about line 21 the covering 20 terminates on the flat surface 16, and there is attached to the leading edge 19 of the covering 20, an anchor skirt 22. It is preferred that the anchor skirt 22 be affixed to the covering by the same attachment means as is provided for the geoinsulation blankets 1. Before finishing the laying of the covering 20, the outboard edge (not shown) of the anchor skirt 22 is covered with a suitable soil windrow 23. The anchor skirt 22 is typically a geotextile, such as a four ounce non-woven polypropylene, equipped with appropriate Velcro attachment means along one edge. By this method, the covering 20 is anchored firmly in place.

The devices of this invention can be rolled into compact rolls, to about one-sixth of their original volume. The roll can be inserted into inexpensive plastic casing to prevent them from unrolling. During this compression step, air escapes from or is evacuated from the geoinsulation blanket 1 through air vent 15. Then the blanket 1 can be shipped, handled, and stored more economically. Once at the use site, the blanket 1 is removed from the plastic sleeve, upon which it expands to its original volume, ready for installation. Thus, it is essential that the insulating batt 9 used in the blanket 1 be resilient and have this recovery property.

I claim:

1. A geoinsulation blanket comprising:

a flexible plastic casing having an outside perimeter consisting of two substantially opposing parallel edges, a front end, a back end, a top surface and a bottom surface; said casing being sealed around its outside perimeter to prevent the ingress and egress of air;

said casing having at least one air vent through it to control the ingress and egress of air;

said casing having a hook and loop type attachment means whereby a wide strip of the attachment means selected from the group consisting of
   a. hook and
   b. loop is fixedly mounted on the top surface and near the outside perimeter of the casing and along one parallel edge and one end, a narrow strip of the attachment means not selected for the top surface is fixedly attached on the bottom surface and near the outside perimeter along the opposite parallel edge and the opposite end; and, there is contained within said casing, a resilient insulation batt.

2. A geoinsulation blanket as claimed in claim 1 in which the flexible plastic casing is formed from polyethylene.

3. A geoinsulation blanket as claimed in claim 1 in which the insulation batt is formed from resilient fiber glass insulation.

4. A system for insulating a substrate, said system comprising one or more of the geoinsulation blankets of claim 1 secured together to form a covering on the substrate, said system being anchored on the substrate by a suitable anchoring means.

5. A system for insulating a substrate as claimed in 4 wherein the anchoring means is an anchoring skirt.

* * * * *